Patented Sept. 27, 1938

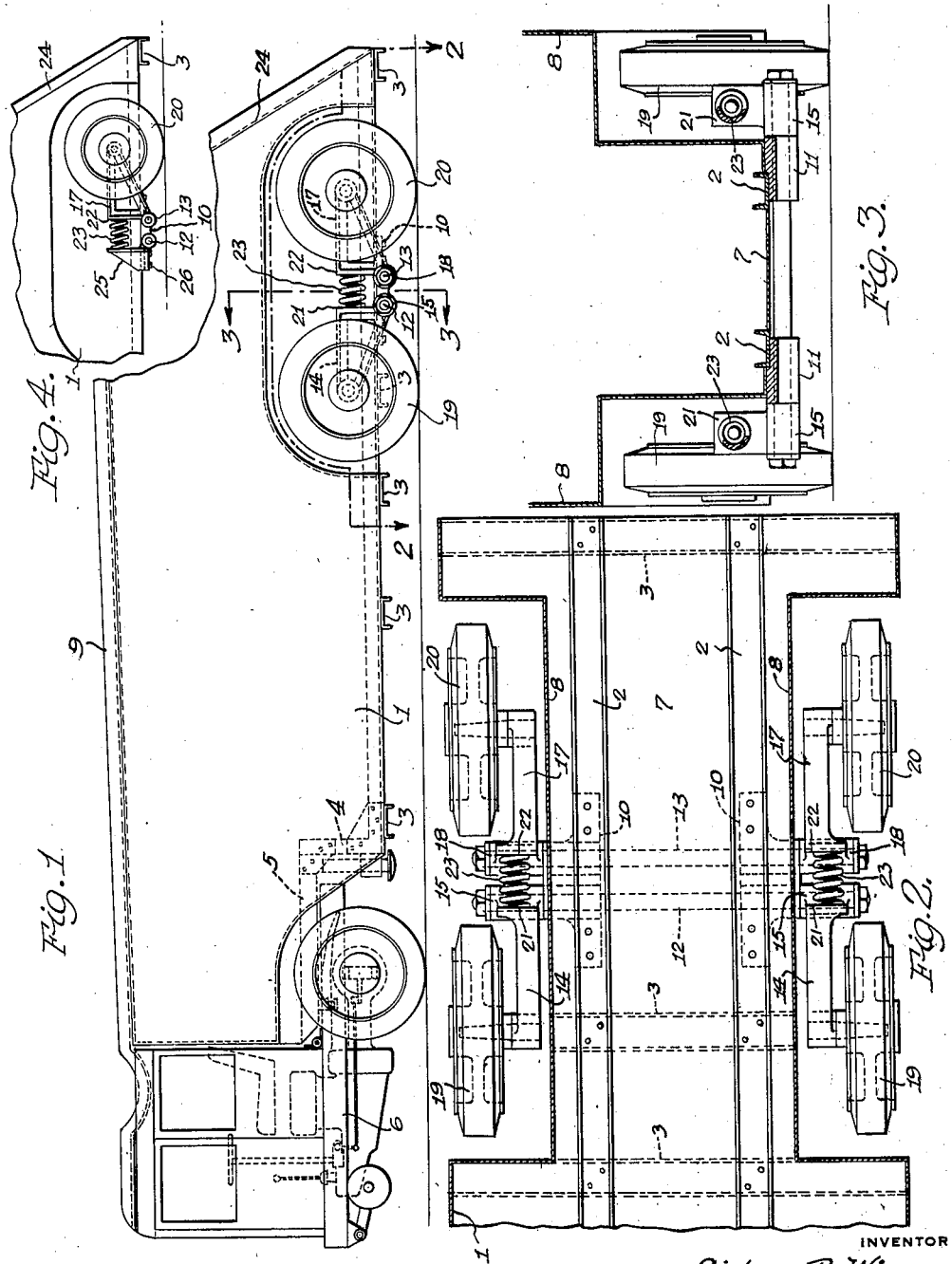

2,131,083

UNITED STATES PATENT OFFICE 2,131,083

SUSPENSION FOR VEHICLES

Sidney B. Winn, Lapeer, Mich.

Application March 23, 1936, Serial No. 70,275

2 Claims. (Cl. 280—124)

The present invention pertains to vehicles designed especially for the purpose of transporting automobiles and like vehicles in decked relation, and more particularly to the spring suspension for such vehicles.

The primary object of the present invention is to provide for individual springing of wheels of an automobile with respect to the frame of the vehicle in order to eliminate the conventional axles which ordinarily extend transversely of the vehicle frame to support wheels on opposite sides of the vehicle, the elimination of such axles being desirable in order to permit the frame of the vehicle to be lowered whereby automobiles may be supported directly upon the frame while other automobiles are supported on a superstructure, supported by such frame, above the automobiles supported by said frame. In certain states statutory regulations prohibit the carrying of loads by trucks or trailers on public highways when such loads exceed a certain height, and in practically all localities, viaducts, subways etc., have standard overhead clearance regulations and therefore in order to facilitate the transportation of automobiles in decked relation on highway vehicles it is essential that the transporting vehicle be so constructed that the over-all height comes within the statutory height limitations and also the railroad regulations.

Another object of the present invention is to provide a vehicle, preferably a trailer type of vehicle, with a dual wheel arrangement at the rear thereof, the dual wheels on opposite sides of the vehicle being individually supported on levers which may move individually with respect to each other and the vehicle frame, and spring means acting upon the said levers, in pairs, for suspending the weight of the trailer with respect to the wheels carried by such levers and for absorbing road shocks and vibrations.

With the above and other ends in view the invention is more fully disclosed with reference to the accompanying drawing in which Figure 1 is a side elevation;

Fig. 2 is a section taken substantially on the line 2—2 of Fig. 1;

Fig. 3 is a section on the line 3—3 of Fig. 1, and

Fig. 4 is a fragmental elevation of another embodiment of the invention.

Like characters of reference are employed throughout to designate corresponding parts.

Referring to the drawing the numeral 1 designates a trailer body comprised of lengthwise extending spaced apart channel shaped frame members 2 which are rigidly secured together by a plurality of transverse reinforcing members 3. Adjacent to the front end of the trailer body the frame members are extended vertically as indicated at 4 and again horizontally at 5 to provide means for attaching the trailer body to a tractor which is generally designated by the numeral 6. Inasmuch as means for attaching trailers to tractors is well known in the art and forms no part of the present invention no such means has been illustrated here.

A floor 7 is supported by the frame members 2 and 3 and vertically extending side walls 8 are provided and at the top thereof is a deck 9 adapted to receive automobiles to support such automobiles above other automobiles whose wheels are received and supported by the channels 2.

Adjacent to the rear ends of the frame members 2 are provided brackets 10 which are rigidly secured to the bottoms of the frame members 2. Each bracket 10 supports a pair of spaced apart bearings 11 supporting a pair of transversely extending shafts 12 and 13, the ends of the shafts being extended outwardly beyond the sides of the frame members 2. Levers 14 have their ends 15 provided with bearings which are rotatably received upon the ends of the shaft 12. Similar levers 17 have their ends 18 provided with bearings which are rotatably received upon the projecting ends of the shaft 13. Wheels 19 are rotatably mounted upon the free ends of the levers 14 and wheels 20 are rotatably mounted upon the ends of the levers 17. Each lever 14 has an angularly extending portion 21 and each lever 17 has a similar angularly extending portion 22 and coiled springs 23 are compressed between the angular portions 21 and 22 on the respective arms 14 and 17.

From the foregoing description it becomes apparent that each of the wheels 19 and 20 are individually supported and each may move vertically with respect to the frame of the vehicle as a result of impact with road irregularities without effecting the position of the other wheels. It will also be noted that the axes of rotation of the wheels 19 and 20 are disposed in a plane higher than the plane of the frame members 2 with the result that such frame members may be supported much closer to the road surface than would be the case if the wheels 19 and 20 were supported upon transversely extending axles because in such case it would be necessary for the frame members to extend over the axles.

In placing the automobiles within the trailer body 1 the door 24 at the rear thereof is opened and automobiles are driven up ramps or from loading platforms directly onto the frame members 2. One of the automobiles preferably will have its front wheels rest upon the relatively elevated portion 5 of the frame while the other automobile or automobiles will rest directly upon the frame members 2. Automobiles may then be loaded upon the deck 9 by means of a ramp or loading platform and secured thereon in any suitable manner.

The advantage of supporting the two sets of levers 14 and 17 on two separate shafts becomes more apparent upon reference to Fig. 4 wherein the drawing illustrates a bracket 25 supported on the shaft and held against rotation relative thereto by means 26. The bracket 25 provides a support for one end of the spring 23, the other end of which engages the lever 17 supporting the wheel 20. The shafts 12 and 13, in being extended across the frame in the manner disclosed, materially reinforce the same without in any way interfering with the loading operations.

Although a specific embodiment of the invention has been illustrated and described it will be understood that various changes may be made within the scope of the appended claims without departing from the spirit of the invention and such changes are contemplated.

What I claim is:—

1. In combination, a vehicle frame, a pair of transverse shafts rigidly secured in parallel spaced relation beneath the frame, levers pivotally mounted on the ends of one of said shafts, wheels supported on the free ends of said levers, springs engaging levers, and stationary brackets on the adjacent ends of the other shaft for supporting said springs whereby they yieldably press against said levers.

2. A spring suspension unit for vehicles comprising a pair of spaced supports, a bracket fixedly mounted on one support, a lever fulcrumed on the other support, means on the free end of said lever for rotatably supporting a wheel, said lever having an angular portion, spring means maintained in compression between said bracket and the angular portion on said lever, said spring means normally maintaining said angular portion in substantially parallel relation with said bracket, and said angular portion being disposed with respect to the main portion of said lever whereby the wheel supporting means resides in a horizontal plane higher than the lever fulcrum when said angular portion is parallel with said bracket.

SIDNEY B. WINN.